United States Patent
Driot et al.

(10) Patent No.: US 9,926,841 B2
(45) Date of Patent: Mar. 27, 2018

(54) ACOUSTIC MEASURING DEVICE

(71) Applicant: BorgWarner Inc., Auburn Hills, MI (US)

(72) Inventors: Nicolas Driot, Gruenstadt (DE); Friedrich Karl Kroehle, Moersfeld (DE); Ivo Nawrath, Mainz (DE)

(73) Assignee: BorgWarner Inc., Auburn Hills, MI (US)

( * ) Notice: Subject to any disclaimer, the term of this patent is extended or adjusted under 35 U.S.C. 154(b) by 194 days.

(21) Appl. No.: 14/760,328

(22) PCT Filed: Jan. 14, 2014

(86) PCT No.: PCT/US2014/011380
§ 371 (c)(1),
(2) Date: Jul. 10, 2015

(87) PCT Pub. No.: WO2014/116460
PCT Pub. Date: Jul. 31, 2014

(65) Prior Publication Data
US 2015/0354446 A1 Dec. 10, 2015

(30) Foreign Application Priority Data
Jan. 23, 2013 (DE) .................. 10 2013 001 138

(51) Int. Cl.
*F02B 39/16* (2006.01)
*F04D 27/00* (2006.01)
(Continued)

(52) U.S. Cl.
CPC .......... *F02B 39/16* (2013.01); *F02D 41/0007* (2013.01); *F04D 27/001* (2013.01);
(Continued)

(58) Field of Classification Search
CPC ...................................................... F02B 39/16
See application file for complete search history.

(56) References Cited

U.S. PATENT DOCUMENTS

| 3,902,895 A * | 9/1975 | Wuth .................. C22B 9/00 |
| | | 266/225 |
| 2004/0079319 A1* | 4/2004 | Cutts .................. F02B 33/40 |
| | | 123/198 E |

(Continued)

OTHER PUBLICATIONS

Wayback Machine archive of Hosecraft USA product page, TDI thermoplastic rubber duct hos, Nov. 2012.*
(Continued)

*Primary Examiner* — Manish S Shah
*Assistant Examiner* — Timothy Graves
(74) *Attorney, Agent, or Firm* — Eric L. Doyle; Stephan A. Pendorf; Patent Central LLC

(57) ABSTRACT

An acoustic measuring device (1) for an exhaust turbocharger, with a compressor housing (2) which comprises a compressor housing inlet (3), a compressor impeller (4), a compressor spiral (5) and a compressor housing outlet (6); with a rotation speed sensor (7) arranged in the compressor spiral (5); with a measurement tube (8) which is connected to the compressor housing outlet (6) and has at least one dynamic pressure sensor (9, 10); with a flexible intermediate pipe (11) which is connected to the measurement tube (8) downstream viewed in the flow direction (R) of the air (L) emerging from the compressor housing outlet (6); with a silencer (12) which is connected to the intermediate pipe (11) downstream; and with a Laval nozzle (13) which is connected to the silencer (12) viewed in the flow direction (R).

7 Claims, 1 Drawing Sheet

(51) Int. Cl.
*F02D 41/00* (2006.01)
*G01M 13/02* (2006.01)
*F01D 17/06* (2006.01)

(52) U.S. Cl.
CPC .......... *G01M 13/028* (2013.01); *F01D 17/06* (2013.01); *F05D 2220/40* (2013.01); *Y02T 10/144* (2013.01)

(56) References Cited

U.S. PATENT DOCUMENTS

| | | | | |
|---|---|---|---|---|
| 2008/0236266 | A1* | 10/2008 | Barton | G01M 15/09 73/114.37 |
| 2008/0286127 | A1* | 11/2008 | Gaude | F02M 35/1272 417/312 |
| 2008/0292449 | A1* | 11/2008 | Lefevre | F04D 29/665 415/58.4 |
| 2010/0023369 | A1* | 1/2010 | Chapman | G06Q 10/04 701/101 |

OTHER PUBLICATIONS

Wayback Machine archive of Hosecraft USA product page, TDI thermoplastic rubber duct hose, Nov. 2012.*

* cited by examiner

ACOUSTIC MEASURING DEVICE

BACKGROUND OF THE INVENTION

Field of the Invention

The invention concerns an acoustic measuring device for an exhaust turbocharger and a method for performing an acoustic measurement on a compressor housing of an exhaust turbocharger.

Description of the Related Art

Core groups of exhaust turbochargers must be balanced and acoustically measured in order to be able to determine the noise level occurring in the compressor. This noise is produced by pressure fluctuations which can be perceived downstream of the compressor housing outlet and should be prevented or at least reduced as far as possible, so that in the installed state in a motor vehicle, they are not perceived as disruptive.

For this, disruptive noise levels are defined in order to achieve said goal of preventing the perception of acoustic disruption during operation of a motor vehicle fitted with an exhaust turbocharger.

Tests performed in the context of the invention have however shown that the existing devices and methods for determining precise and representative values of such disruptive noise levels are not satisfactory.

BRIEF SUMMARY OF THE INVENTION

The object of the present invention is therefore to create an acoustic measuring device and a method for performing an acoustic measurement on a compressor housing of an exhaust turbocharger, which overcome said disadvantages of the prior art, such as in particular an imprecise and non-representative determination of the noise level.

In particular according to the invention the following benefits are achieved:

A reduction in noise originating from the structure of the acoustic measuring device itself.

A precise measurement of the noise level produced by the compressor of the core group of the exhaust turbocharger.

An improvement in the measurement result reliability. In particular the repeatability can be improved by a factor of 2 and the spread of measurement results reduced. Furthermore an improvement can be achieved in the correlation of results between tests in the motor vehicle and tests on the test bench.

Finally an improvement in the acoustic behavior of the turbocharger can be achieved independently of the vehicle, which allows a uniformity of construction of the compressor with regard to acoustics.

The device according to the invention is constructed substantially from the following components:

1. A compressor housing which as far as possible corresponds to a standard housing used in an exhaust turbocharger to be installed in a vehicle, wherein the compressor housing provided in the measurement device however has a rotation speed sensor arranged in the compressor spiral.

2. Here the compressor inlet is preferably formed as a single, relatively short pipe which has at least substantially the same diameter as the compressor housing inlet.

3. A measuring tube which is preferably mounted flexibly on the compressor housing to avoid the transmission of vibrations. The measurement tube is here fitted with at least one, usually however with a plurality of dynamic pressure sensors.

4. A flexible intermediate pipe, preferably made of rubber.

5. An arrangement of specific volume bodies which are connected downstream of the intermediate pipe when viewed in the air flow direction and are preferably formed as an acoustic impedance pipe which is also known as anti-echo pipe (anechoic termination). Preferably the structure and function of such an impedance pipe corresponds to standard DIN EN ISO 5136.

6. Finally a turbulence-free, back-pressure baffle tube is provided which is preferably formed as a Laval nozzle. The inner profile of such a nozzle should preferably be formed aerodynamically.

7. The body volumes formed by said components are attached to each other. The fixings are formed such that they are free from sharp edges and large diameter jumps in order to prevent the generation of turbulent flow. Furthermore adequate decoupling of body-borne sound must be taken into account. The sequence of arrangement of said components is selected such that the desired technical advantages can be achieved for the noise measurement required.

Consequently the measurement chain contains at least the following components, ideally arranged in the following order (in the through-flow direction):

Compressor housing
Dynamic pressure sensor(s)
Elastic intermediate pipe
Anechoic termination (arrangement of specific volume bodies)
Aerodynamically favorable cross-section tapering (e.g. Laval nozzle).

The compressor outlet diameter here defines the diameter values of the other body volumes.

As already described, the compressor housing provided in the measurement device according to the invention is constructed as identically as possible to a compressor housing used in a standard turbocharger. According to the invention it is possible that a compressor housing is part of the acoustic measuring device, wherein after measurement a standard compressor housing is mounted on the core group to complete the turbocharger. In principle however it is also conceivable that a standard compressor housing is mounted on the core group before measurement and serves as a measurement compressor housing. In this case the compressor housing naturally does not need to be exchanged. The turbocharger core group here means the arrangement of the compressor impeller and the turbine impeller on the rotor shaft mounted in the bearing housing.

The rotation speed sensor in the compressor housing measures the rotation speed of the compressor impeller, wherein for example the compressor impeller blades passing the rotation speed sensor can be counted in order to derive the rotation speed.

The measurement tube with its preferably one to six dynamic pressure sensors is provided to determine the acoustic pressure in the measurement tube in at least two different planes.

The flexible pipe or rubber pipe is, where necessary, designed sufficiently elastic to allow flexible installation in the acoustic measuring device with adaptation to different core groups to be measured and preferably balanced.

The anechoic termination has two functions: firstly persistent flow noise is absorbed and shock waves directed acoustically backwards, i.e. towards the compressor housing, are eliminated. This function is preferably performed in a frequency range between 400 Hz to minimum 4 kHz depending on application and taking into account the frequency range of the 1st order in the operating range.

The Laval nozzle also has two functions: firstly it creates the back-pressure necessary for measurement, and also to allow the necessary forces for the axial bearing system of the turbocharger core group. Furthermore as little flow noise as possible should be produced, which means that a turbulence-free flow should be produced through the Laval nozzle due to the inner contour.

Preferably it is possible to integrate the acoustic measuring device according to the present invention in a standard balancing machine for turbocharger core groups.

As well as the benefits explained above, the structure according to the invention gives the following advantages:

- The measurement tube or measurement line can be arranged at any suitable point between the compressor housing and the anechoic termination without this influencing noise sources.
- Flow noise sources which originate from the device structure itself can be minimized.
- The total length of the structure of the device advantageously plays no role in the measurement accuracy or the measurement performance, and has practically no influence on the measurement results.
- The frequency range for which measurement is of interest is sufficiently wide to be able to cover the noise behavior of turbocompressors within the practical limit of interest.

In principle however a change to the order of components explained above in the measurement device according to the invention is possible if necessary or advantageous in one application case or another.

BRIEF DESCRIPTION OF THE SEVERAL VIEWS OF THE DRAWINGS

Further details, benefits and features of the present invention arise from the description below of an exemplary embodiment and the drawings. These show.

DETAILED DESCRIPTION OF THE INVENTION

Figure 1:
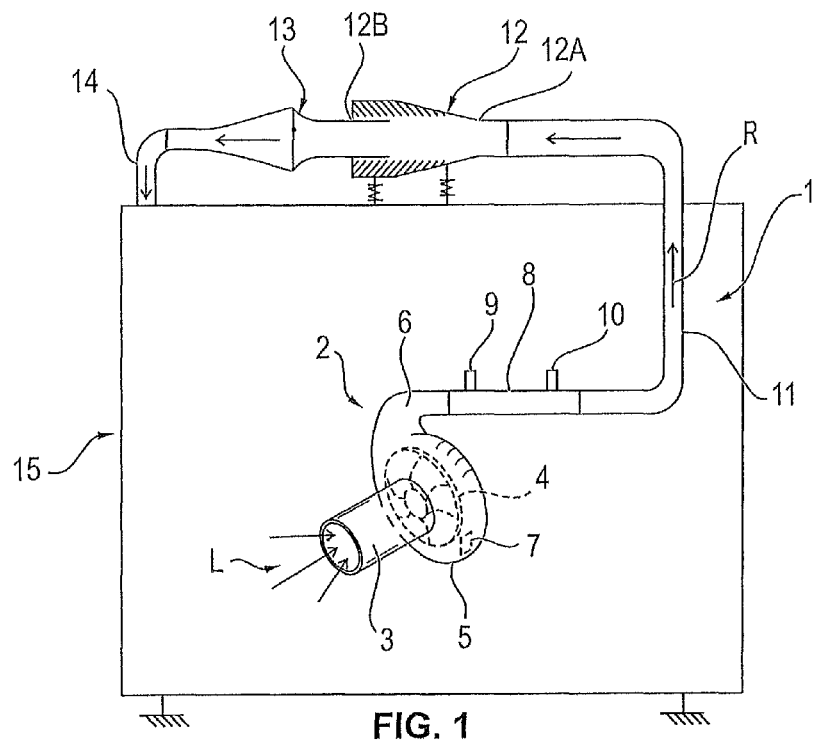
FIG. 1 a diagrammatic, highly simplified principle view of an acoustic measuring device according to the invention.

FIG. 1 shows a diagrammatic, highly simplified principle view of an acoustic measuring device 1 according to the invention.

The acoustic measuring device 1 firstly has a compressor housing 2 which comprises a compressor housing inlet 3, a compressor impeller 4, a compressor spiral 5 surrounding the compressor impeller 4, and a compressor housing outlet 6. A rotation speed sensor 7 is arranged in the compressor spiral 5 and determines the rotation speed of the compressor impeller 4.

A measurement tube 8 is connected to the compressor housing outlet in the flow direction R of the air L emerging from the compressor housing outlet 6, and in the embodiment shown in FIG. 1 is fitted with two dynamic pressure sensors 9 and 10 spaced apart viewed in the flow direction R.

A flexible intermediate pipe 11 is arranged downstream of the measurement tube 8 viewed in the flow direction R, and is connected to the measurement tube 8 and can be made for example from rubber material.

Again viewed in the flow direction R, a silencer 12 is connected downstream of the flexible intermediate pipe 11 and at its one end 12a is fluidically connected with the intermediate pipe 11 and at its other end 12b is connected to a Laval nozzle 13, which in turn is fluidically connected via an end pipe 14 to a balancing device 15, in which the acoustic measuring device 1 according to the invention is integrated according to the exemplary embodiment shown in FIG. 1. It is however self-evident that the acoustic measuring device 1 can also constitute a separate measuring device, since its structure and function are not dependent on integration in a balancing device.

Figures 2, 3:
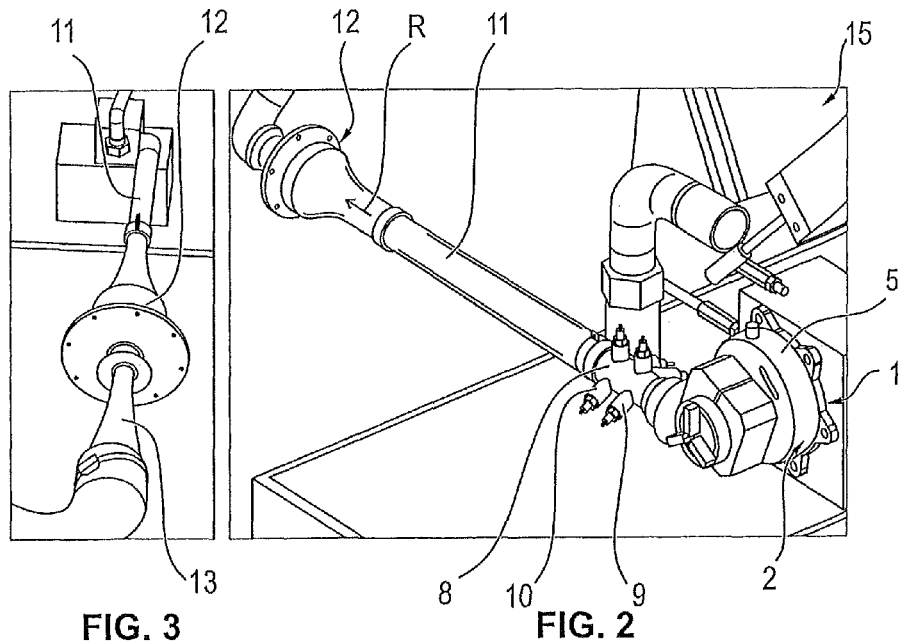
FIG. 2 an example of integration of the acoustic measuring device according to the invention in a balancing machine.
FIG. 3 a view of the acoustic measuring device provided in the balancing machine at the end of the measurement line which is fitted with a Laval nozzle.

FIGS. 2 and 3 further illustrate the integration of the acoustic measuring device 1 in the balancing machine 15, wherein the embodiment according to FIG. 2—as already explained—comprises one or more dynamic pressure sensors mounted on the measurement tube 8 which, as required, are arranged spaced apart viewed in the flow direction R so that measurement is possible in two planes.

According to the structure of the acoustic measuring device 1 explained above, a method for performance of an acoustic measurement on the compressor housing 2 described of an exhaust turbocharger (not shown in full) can be performed with the following process steps:

- Measurement of the dynamic pressure in the measurement tube 8 mounted on the compressor housing outlet 6, preferably in two spaced measurement planes.
- Absorption of persistent flow noises and elimination of acoustic shock waves directed towards the compressor housing downstream of the measurement tube 8, in order to improve the precision and repeatability of determination of the dynamic pressure in the measurement tube 8. Here preferably a frequency range between 400 Hz and around 4 kHz is covered.
- Finally in a region downstream of the measurement tube and the intermediate pipe, the back-pressure necessary to build up pressure in the compressor housing 2 is created, wherein the production of flow noises which could cause a deterioration in measurement accuracy is suppressed. The back-pressure is here also created downstream of the measurement tube 8 or intermediate pipe 11.

As well as the written description of the invention above, for supplementary disclosure explicit reference is hereby made to the drawn depiction of the invention in FIGS. 1 to 3.

LIST OF REFERENCE NUMERALS

1 Acoustic measuring device
2 Compressor housing
3 Compressor housing inlet
4 Compressor impeller
5 Compressor spiral
6 Compressor housing outlet
7 Rotation speed sensor
8 Measurement tube
9, 10 Dynamic pressure sensors
11 Flexible intermediate pipe
12 Silencer 13 Laval nozzle
14 End pipe
15 Balancing machine
L Air
R Flow direction of air

The invention claimed is:

1. An acoustic measuring device (1) for an exhaust turbocharger, with
- a compressor housing (2) which comprises a compressor housing inlet (3), a compressor impeller (4), a compressor spiral (5) and a compressor housing outlet (6);
- a rotation speed sensor (7) arranged in the compressor spiral (5);
- a measurement tube (8) which is connected to the compressor housing outlet (6) and has a direction of flow (R) and has at least two dynamic pressure sensors (9, 10) arranged on the measurement tube (8) spaced apart viewed in the flow direction (R) and adapted to determine the acoustic pressure in the measurement tube in at least two different planes;
- a flexible intermediate pipe (11) which is connected to the measurement tube (8) downstream viewed in the flow direction (R) of the air (L) emerging from the compressor housing outlet (6);
- a silencer (12) which is connected to the intermediate pipe (11) downstream; and
- a Laval nozzle (13) which is connected to the silencer (12) viewed in the flow direction (R).

2. The acoustic measuring device as claimed in claim 1, wherein the compressor housing (2) is an integral component of the acoustic measuring device (1).

3. The acoustic measuring device as claimed in claim 1, wherein the measurement tube (8) is attached flexibly to the compressor housing outlet (6).

4. The acoustic measuring device as claimed in claim 1, wherein the intermediate pipe (11) is a rubber pipe at least 1 meter long.

5. The acoustic measuring device as claimed in claim 1, wherein the silencer (12) is formed as an acoustic impedance pipe.

6. An acoustic measuring device (1) for an exhaust turbocharger, with
- a compressor housing (2) which comprises a compressor housing inlet (3), a compressor impeller (4), a compressor spiral (5) and a compressor housing outlet (6);
- a rotation speed sensor (7) arranged in the compressor spiral (5);
- a measurement tube (8) which is connected to the compressor housing outlet (6) and has at least one dynamic pressure sensor (9, 10) adapted to determine the acoustic pressure in the measurement tube;
- a flexible intermediate pipe (11) which is connected to the measurement tube (8) downstream viewed in the flow direction (R) of the air (L) emerging from the compressor housing outlet (6);
- a silencer (12) which is connected to the intermediate pipe (11) downstream; and
- a Laval nozzle (13) which is connected to the silencer (12) viewed in the flow direction (R),
wherein the compressor housing (2), the measurement tube (8), the intermediate pipe (11), the silencer (12) and the Laval nozzle (13) are integrated in an exhaust turbocharger balancing machine (15).

7. A method for performance of an acoustic measurement on a compressor housing (2) of an exhaust turbocharger, with the following process steps:
- measurement of the acoustic pressure in a measurement tube (8) mounted at a compressor housing outlet (6), the measurement tube (8) having a direction of flow (R) at least two dynamic pressure sensors (9, 10) adapted to determine the acoustic pressure in the measurement tube and arranged spaced apart viewed in the flow direction (R) to determine the acoustic pressure in the measurement tube in at least two different planes;
- absorption of persistent flow noises and elimination of acoustic shock waves directed towards the compressor housing (2) downstream of the measurement tube (8), in a frequency range between 400 Hz to around 4 kHz; and
- creation of a back-pressure necessary to build up pressure in the compressor housing (2) while preventing flow noises in a Laval nozzle (13) provided downstream of the measurement tube (8).

* * * * *